US012600278B2

(12) United States Patent
Modh et al.

(10) Patent No.:     US 12,600,278 B2
(45) Date of Patent:     Apr. 14, 2026

(54) VEHICLE SEAT FLOOR FILLER

(71) Applicant: Volvo Car Corporation, Gothenburg (SE)

(72) Inventors: Lars Modh, Uddevalla (SE); Peter Setterberg, Partille (SE)

(73) Assignee: Volvo Car Corporation, Gothenburg (SE)

( * ) Notice: Subject to any disclaimer, the term of this patent is extended or adjusted under 35 U.S.C. 154(b) by 198 days.

(21) Appl. No.: 18/544,822

(22) Filed: Dec. 19, 2023

(65) Prior Publication Data

US 2025/0196741 A1     Jun. 19, 2025

(51) Int. Cl.
*B60N 2/70*          (2006.01)

(52) U.S. Cl.
CPC .................................. B60N 2/7035 (2013.01)

(58) Field of Classification Search
CPC ........ B60N 2/012; B60N 2/28; B60N 2/2866; B60N 2/289; B60N 2/30; B60N 2/3072; B60N 2/3075; B60N 2/3081; B60N 2/3086; B60N 2/3097; B60N 2/502; B60N 2/505; B60N 2/54; B60N 2/7035
See application file for complete search history.

(56) References Cited

U.S. PATENT DOCUMENTS

| | | | | | | |
|---|---|---|---|---|---|---|
| 1,203,729 | A | * | 11/1916 | Hammers | ............ | B60N 2/3086 |
| | | | | | | 297/236 |
| 1,553,527 | A | * | 9/1925 | Hamel | .................... | B60N 2/012 |
| | | | | | | 296/63 |
| 2,789,621 | A | * | 4/1957 | Langtry | ................. | B60N 2/012 |
| | | | | | | 296/68.1 |
| 3,144,270 | A | * | 8/1964 | Bilancia | ................. | B60N 2/548 |
| | | | | | | 297/DIG. 8 |
| 3,743,230 | A | * | 7/1973 | Freedman | .............. | B60N 2/502 |
| | | | | | | 248/585 |
| 5,570,866 | A | * | 11/1996 | Stephens | ................. | B60N 2/527 |
| | | | | | | 267/117 |
| 6,752,443 | B1 | * | 6/2004 | Thompson | ........... | B60N 2/3072 |
| | | | | | | 297/188.1 |
| 7,419,209 | B1 | * | 9/2008 | Mangiapane | ....... | H01M 50/244 |
| | | | | | | 296/63 |
| 7,891,737 | B2 | * | 2/2011 | Mather | .................. | B60N 2/015 |
| | | | | | | 296/65.09 |
| 9,630,531 | B1 | * | 4/2017 | Privatera | .................. | B60N 2/26 |
| 2007/0013204 | A1 | * | 1/2007 | Yajima | .................. | B60N 2/062 |
| | | | | | | 296/65.09 |
| 2010/0213345 | A1 | * | 8/2010 | Haller | .................... | B60N 2/501 |
| | | | | | | 248/550 |

(Continued)

FOREIGN PATENT DOCUMENTS

| | | | | | |
|---|---|---|---|---|---|
| CA | 2515781 | C | * 10/2009 | ............. | B60N 2/501 |
| CN | 107199920 | A | * 9/2017 | ............. | H02N 2/186 |

(Continued)

*Primary Examiner* — Ryan D Kwiecinski
(74) *Attorney, Agent, or Firm* — Clements Bernard Walker; Christopher L. Bernard

(57)          ABSTRACT

A seat filler assembly for a vehicle. The seat filler assembly includes a seat filler structure adapted to be disposed between a seat bottom of a seat and a floor structure of the vehicle. The seat filler assembly also includes one or more rigid members adapted to couple the seat bottom to the floor structure through the seat filler structure.

20 Claims, 6 Drawing Sheets

(56)  References Cited

U.S. PATENT DOCUMENTS

| | | | | |
|---|---|---|---|---|
| 2011/0018300 | A1* | 1/2011 | Galbreath | B60N 2/015 |
| | | | | 296/63 |
| 2011/0018329 | A1* | 1/2011 | Galbreath | B60N 2/01508 |
| | | | | 296/63 |
| 2015/0175040 | A1* | 6/2015 | Meszaros | B60N 2/3045 |
| | | | | 297/188.01 |
| 2015/0367813 | A1* | 12/2015 | Ballarin | B60R 22/18 |
| | | | | 280/805 |
| 2016/0200224 | A1* | 7/2016 | Fujikake | B60N 2/286 |
| | | | | 297/452.38 |
| 2017/0036572 | A1* | 2/2017 | Hansen | B60N 2/3011 |
| 2017/0274800 | A1* | 9/2017 | Hansen | B60N 2/3065 |
| 2018/0126835 | A1* | 5/2018 | Saeki | B62D 25/20 |
| 2018/0370396 | A1* | 12/2018 | Mozurkewich | B60N 2/345 |
| 2019/0152357 | A1* | 5/2019 | Harrison, III | B60N 2/309 |
| 2020/0223303 | A1* | 7/2020 | Saeki | B60R 22/26 |
| 2021/0214088 | A1* | 7/2021 | Kigoshi | B64D 11/06 |
| 2022/0097575 | A1* | 3/2022 | Kondo | B60N 2/289 |
| 2023/0347792 | A1* | 11/2023 | Abro | B60N 2/01508 |
| 2024/0051435 | A1* | 2/2024 | Mastroianni | B60N 2/012 |
| 2024/0416809 | A1* | 12/2024 | Furuta | B60N 2/501 |
| 2025/0196741 | A1* | 6/2025 | Modh | B60N 2/7035 |

FOREIGN PATENT DOCUMENTS

| | | | | |
|---|---|---|---|---|
| CN | 113525200 A | * | 10/2021 | B60N 2/68 |
| CN | 114074590 A | * | 2/2022 | B60N 2/2875 |
| CN | 116572807 A | * | 8/2023 | F16F 9/42 |
| DE | 102021132191 A1 | * | 6/2023 | B60N 2/065 |
| EP | 1481840 A1 | * | 12/2004 | B60N 2/3047 |
| EP | 2123507 A1 | * | 11/2009 | B60R 22/1952 |
| EP | 3778336 A1 | * | 2/2021 | B60R 7/043 |
| FR | 2962948 A1 | * | 1/2012 | B60N 2/012 |
| JP | 2002347496 A | * | 12/2002 | |
| KR | 20150073686 A | * | 7/2015 | B60N 2/54 |
| WO | WO-2015190274 A1 | * | 12/2015 | B60N 2/30 |
| WO | WO-2019088297 A1 | * | 5/2019 | B64D 25/04 |

* cited by examiner

Adapt a seat filler structure
to be disposed between a
seat bottom of a seat and a
floor structure of a vehicle          — 502

Adapt one or more rigid
members to couple the seat
bottom to the floor structure
through the seat filler structure          — 504

VEHICLE SEAT FLOOR FILLER

INTRODUCTION

The present disclosure relates generally to the automotive and seating fields. Some conventional vehicles have a floor filler between a seat or seat bench bottom and the floor or body-in-white (BIW), where the floor filler is made out of polyurethane (PUR) foam and necessarily includes in-molded steel parts. This floor filler provides elevation for the seat or seat bench bottom above the floor or BIW, and the in-molded steel part structurally connects the seat or seat bench to the BIW. Such floor fillers are relatively complex, heavy, and the components may not readily be separated for recycling, for example. Thus, historically, there has been a problem of fixing the seat or seat bench bottom and floor filler to the floor or BIW of the vehicle in an effective and efficient way. In a crash, for example, the floor filler may move forward and thus does not alone provide sufficient support for the seat cushion and occupant. In electric vehicles, the situation is potentially worse because of the flat shape of the floor. Non-electric vehicles typically include a raised portion of the floor or other contours that run from the front to the rear of the vehicle, for example, where the raised portion conforms around a drive train. The raised portion potentially provides some stabilizing structure for the floor filler. Electric vehicles having flat floors do not typically include such a stabilizing structure. Conventional solutions involve floor fillers that are too heavy, complex, and expensive.

The present introduction is provided as background context only and is not intended to be limiting in any manner. It will be readily apparent to those of ordinary skill in the art that the concepts and principles of the present disclosure may be implemented in other applications and contexts equally.

SUMMARY

The present disclosure relates to a seat filler assembly of a vehicle. The seat filler assembly includes a seat and a seat filler structure, where the seat filler structure is adapted to be positioned or disposed between the seat bottom and a floor structure or floor of the vehicle, also generally referred to as the BIW. The seat filler structure includes one or more rigid members adapted to couple the seat bottom to the floor structure through the seat filler structure. As described in more detail herein, the rigid members anchor the seat filler structure and seat to the floor structure. The combination of the seat filler structure and its associated components, including the rigid members, prevent the seat from sliding longitudinally/laterally in the event of a sudden stop or collision, for example.

In one illustrative embodiment, the present disclosure provides a seat filler assembly for a vehicle. The seat filler assembly includes a seat filler structure adapted to be disposed between a seat bottom of a seat and a floor structure of the vehicle; and one or more rigid members adapted to couple the seat bottom to the floor structure through the seat filler structure. Optionally, in some embodiments, the seat filler structure provides elevational support for the seat, and wherein the one or more rigid members provide longitudinal/lateral restraint for the seat through the seat filler structure. In some embodiments, the seat filler structure elevates the seat at a predetermined height above the floor structure of the vehicle. In some embodiments, the seat filler structure comprises one or more passages through which the one or more rigid members are received. In some embodiments, at least one rigid member of the one or more rigid members comprises a slot, and wherein the slot is adapted to receive a tab for aligning the seat bottom with the seat filler structure. In some embodiments, at least one rigid member of the one or more rigid members comprises a hook member, and wherein the hook member is adapted to hook onto the seat bottom for securing the seat bottom to the seat filler structure. In some embodiments, the seat filler assembly of claim 1 further includes one or more fixation members, where at least one fixation member of the one or more fixation members positions at least one rigid member of the one or more rigid members for attachment to the seat bottom.

In another illustrative embodiment, the present disclosure provides a seat assembly for a vehicle. The seat assembly includes a seat; a seat filler structure adapted to be disposed between a seat bottom of the seat and a floor structure of the vehicle; and one or more rigid members adapted to couple the seat bottom to the floor structure through the seat filler structure. Optionally, in some embodiments, the seat filler structure provides elevational support for the seat, and wherein the one or more rigid members provide longitudinal/lateral restraint for the seat through the seat filler structure. In some embodiments, the seat filler structure elevates the seat at a predetermined height above the floor structure of the vehicle. In some embodiments, the seat filler structure comprises one or more passages through which the one or more rigid members are received. In some embodiments, at least one rigid member of the one or more rigid members comprises a slot, and wherein the slot is adapted to receive a tab for aligning the seat bottom with the seat filler structure. In some embodiments, at least one rigid member of the one or more rigid members comprises a hook member, and wherein the hook member is adapted to hook onto the seat bottom for securing the seat bottom to the seat filler structure. In some embodiments, the seat assembly further includes one or more fixation members, wherein at least one fixation member of the one or more fixation members positions at least one rigid member of the one or more rigid members for attachment to the seat bottom.

In a further illustrative embodiment, the present disclosure provides a method for manufacturing a seat filler assembly for a vehicle. The method includes: adapting a seat filler structure to be disposed between a seat bottom of a seat and a floor structure of the vehicle; and adapting one or more rigid members to couple the seat bottom to the floor structure through the seat filler structure. Optionally, in some embodiments, the seat filler structure provides elevational support for the seat, and wherein the one or more rigid members provide longitudinal/lateral restraint for the seat through the seat filler structure.

In some embodiments, the seat filler structure elevates the seat at a predetermined height above the floor structure of the vehicle. In some embodiments, the seat filler structure comprises one or more passages through which the one or more rigid members are received. In some embodiments, at least one rigid member of the one or more rigid members comprises a slot, and wherein the slot is adapted to receive a tab for aligning the seat bottom with the seat filler structure. In some embodiments, at least one rigid member of the one or more rigid members comprises a hook member, and wherein the hook member is adapted to hook onto the seat bottom for securing the seat bottom to the seat filler structure.

BRIEF DESCRIPTION OF THE DRAWINGS

The present disclosure is illustrated and described with reference to the various drawings, in which like reference numbers are used to denote like assembly components and/or method steps, as appropriate.

DETAILED DESCRIPTION

Figure 1:
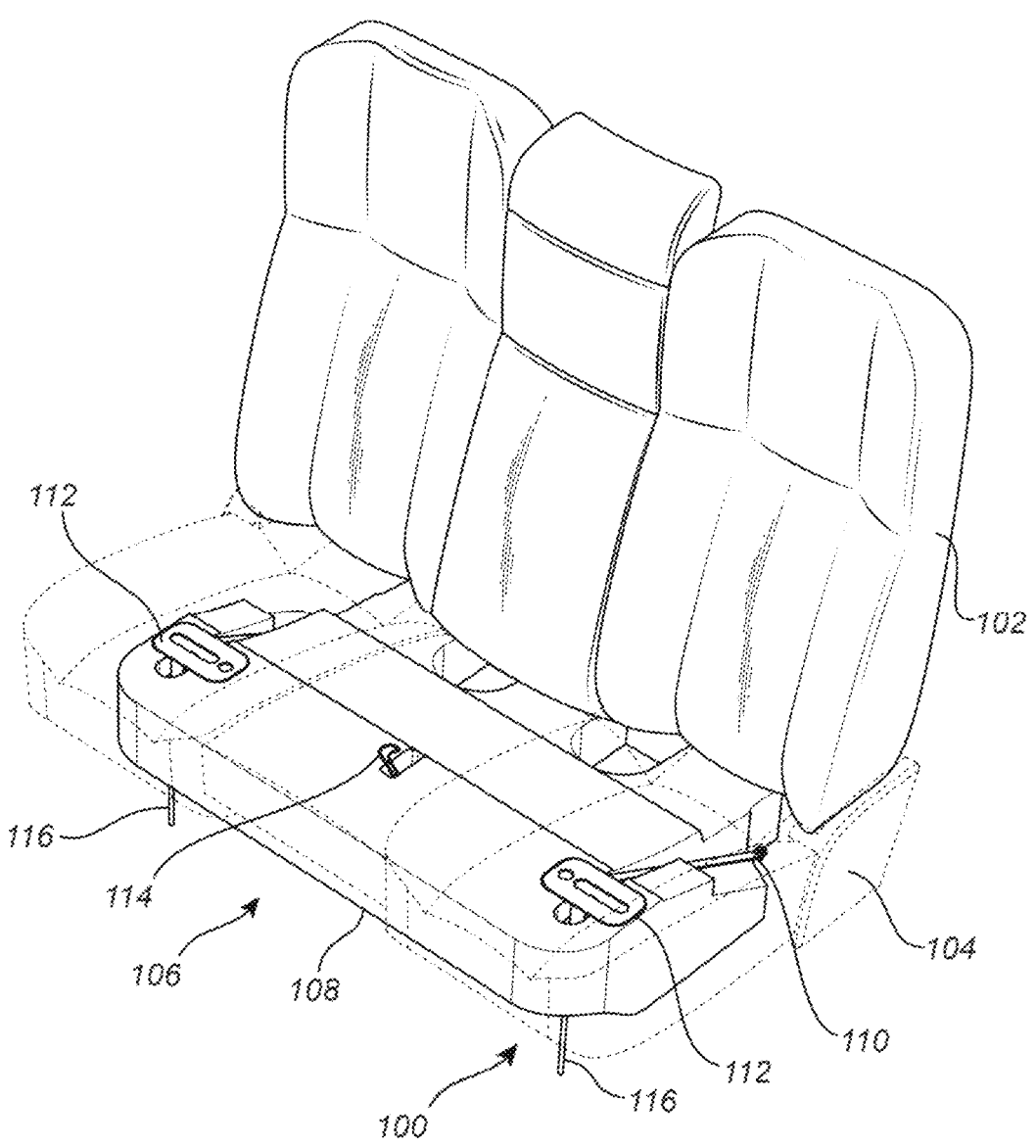
FIG. 1 is a perspective-view diagram of a seat assembly for a vehicle.

FIG. 1 is a perspective-view diagram of a seat assembly 100 for a vehicle. As shown, the seat assembly 100 includes a seat and a seat filler structure positioned between the seat and a floor structure or floor (i.e., BIW) of the vehicle. The seat has a backrest 102 or seat back 102 and a seat bottom 104. The seat assembly 100 also includes a seat filler assembly 106 for the vehicle (not shown). In various embodiments, the seat filler assembly 106 includes a seat filler structure 108. In various embodiments, the seat filler structure 108 is adapted to be disposed between the seat bottom 104 of the seat and a floor structure (not shown). The floor structure may be a floor portion of the BIW of the vehicle, which is attached to or forms part of the chassis of the vehicle. The seat filler assembly 106 also includes one or more rigid members 110. The one or more rigid members 110 are adapted to couple the seat bottom 104 to the floor structure through the seat filler structure 108.

The seat filler assembly 106 may be applied to any bench-style seat of a vehicle. For example, the seat filler assembly 106 may be used under the back seat of a sedan, the second row or third row of sport utility vehicle (SUV), the cab seat of a truck, etc. The seat filler assembly 106 potentially, although not exclusively, provides the most benefit for electric vehicles, where the floors are flat in the absence of a drive train. In other implementations, the seat assembly 100 and the seat filler assembly 106 may not have all of the components shown and/or may have other elements including other types of elements instead of, or in addition to, those shown herein. Further example embodiments of the seat filler assembly 106 are described below in connection with FIGS. 2, 3, and 4.

The seat filler structure 108 may be a molded single piece, and lightweight. The seat filler structure 108 may be manufactured from any suitable rigid material. The type of material may vary, and will depend on the particular implementation. For example, in some embodiments, the seat filler structure 108 may be made of a plastic or composite material. In some embodiments, the seat filler structure 108 may be made of an expanded polypropylene (EPP) material. In some embodiments, the seat filler structure 108 may be made of fiberglass material, etc. The EPP material may have any desired surface finish and/or may be covered by a covering material, such as a carpeting material, etc.

In various embodiments, the seat filler structure 108 provides elevational support and restraint for the seat, in particular at the seat bottom 104, where the seat filler structure 108 meets the seat bottom 104. In various embodiments, the seat filler structure 108 provides upward, horizontal support and elevation for the seat bottom 104, such that when a person sits on the seat bottom 104 or cargo is placed on the seat bottom 104, the seat bottom remains in place at its existing height above the floor structure or floor of the vehicle. In various embodiments, the seat filler structure 108 elevates the seat, in particular at the seat bottom 104, at a predetermined height above the floor structure or floor of the vehicle. As such, the height at the bottom side of the seat bottom 104 is the substantially the same height as the seat filler structure 108.

In various embodiments, the one or more rigid members 110 provide longitudinal/lateral restraint for the seat through the seat filler structure, in particular at the seat bottom 104 where the seat filler structure 108 couples to the seat bottom 104. In various embodiments, the seat filler structure 108 includes one or more passages, where the one or more rigid members 110 are received through the passages. An example interrelation between the one or more rigid members 110 and the seat filler structure 108 is described in more detail herein, in connection with FIGS. 2, 3, and 4.

In various embodiments, the one or more rigid members 110 each include a slot 112 at a seat bottom interface end thereof. In this particular example, two example slots 112 of two rigid members 110 are shown. Each slot 112 is adapted to receive a tab (FIG. 4) for aligning the seat bottom 104 with the seat filler structure 108 and, to a modest degree, securing the seat bottom 104 to the seat filler structure 108. Example embodiments of the tab are described in more detail below, in connection with FIG. 4.

In various embodiments, at least one rigid member of a group of rigid members includes a hook member 114. The hook member 114 is adapted to hook onto the seat bottom 104 for securing the seat bottom 104 to the seat filler structure 108. The hook member 114 also provides longitudinal/lateral support for the seat bottom 104. An example interrelation between the hook member 114 and the seat bottom 104 is described in more detail herein, in connection with FIG. 2.

In various embodiments, the seat filler assembly 106 includes one or more fixation members 116. The one or more fixation members position one or more corresponding rigid members 110 for attachment to the seat bottom 104. An example interrelation between a fixation member 116 and a rigid member 110 is described in more detail herein, in connection with FIG. 2.

Figure 2:
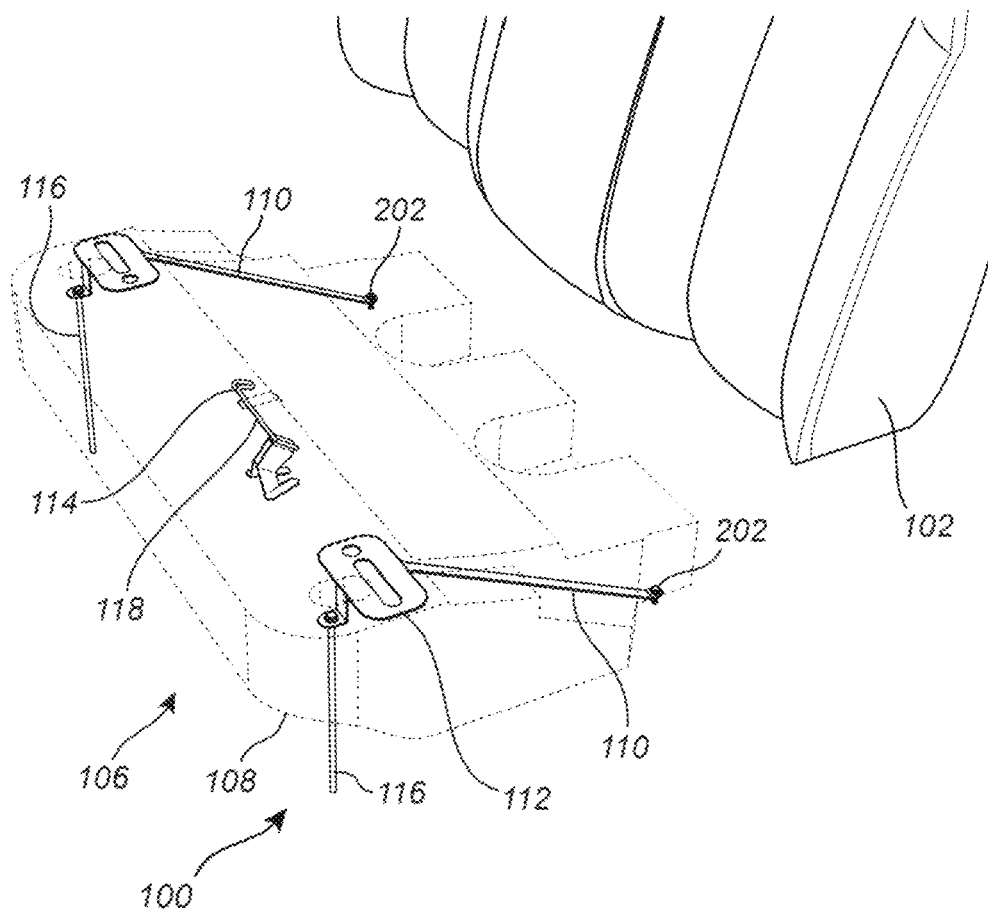
FIG. 2 is a perspective-view diagram of a portion of a seat assembly for a vehicle, including seat filler structure components.

FIG. 2 is a perspective-view diagram of a portion of the seat assembly 100 for a vehicle, including seat filler structure components. Shown is the seat filler assembly 106 of FIG. 1 (indicated by an arrow) in a transparent view showing various components of the seat filler assembly 106. In various embodiments, the seat filler assembly 106 includes the seat filler structure 108, the rigid members 110, the slot 112 of one of the rigid members 110, the fixation members 116, and the hook member 114 attached to a rigid member 118. In other embodiments, the seat filler assembly 106 may not have all of the components shown and/or may have other elements including other types of elements instead of, or in addition to, those shown herein.

In various embodiments, the rigid members 110 pass through the seat filler structure 108 at a predetermined angle relative to the bottom plane of the seat filler structure 108 and the floor structure or floor (not shown) of the vehicle. In this example, the rigid members 110 pass through the seat filler structure 108 at approximately 45 degrees relative to the bottom plane of the seat filler structure 108.

In various embodiments, the predetermined angle provides inherent longitudinal/lateral support for the seat filler structure 108. As shown, the rigid members 110 are attached to the floor structure with screws 202. The particular method of attachment may vary, depending on the particular implementation. The fixation members 116 (one shown) pass substantially vertically through the seat filler structure 108 and connect to their corresponding rigid members 110. The fixation members 116 have predetermined or adjustable lengths that position the upper ends of corresponding rigid members 110 at a sufficient height for attachment to the seat bottom.

Figure 3:
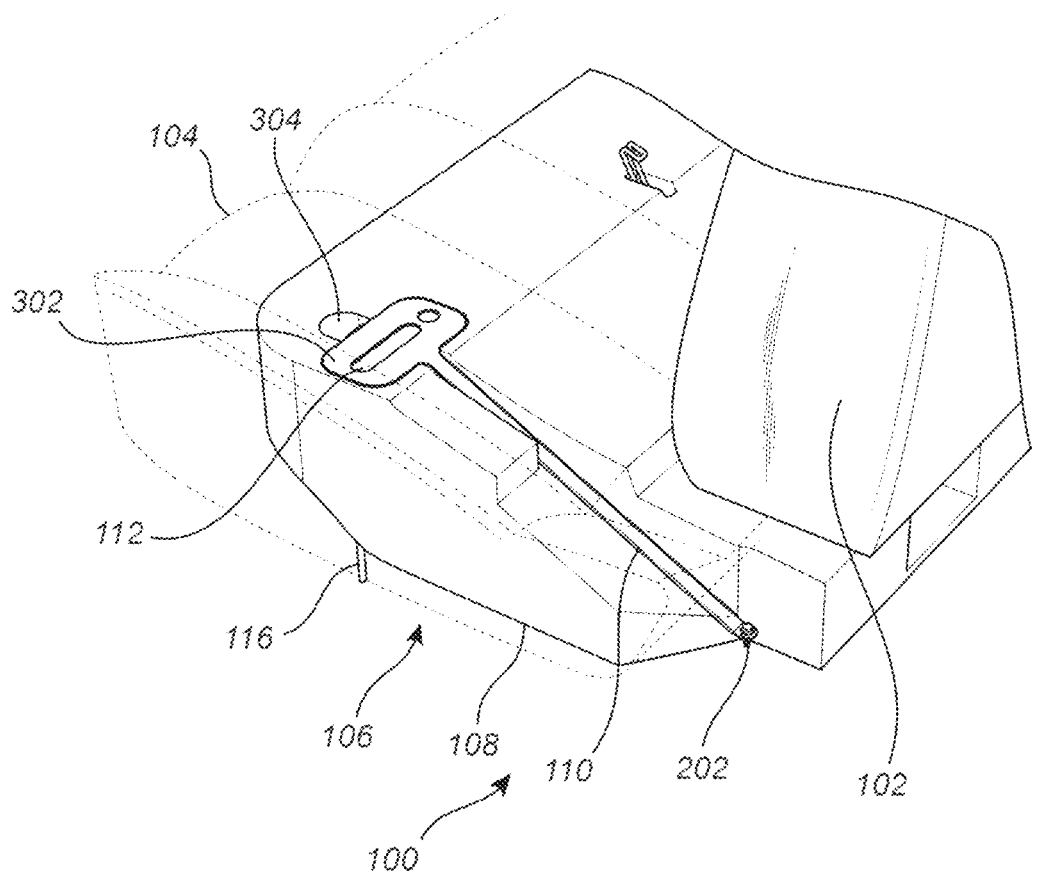
FIG. 3 is a perspective-view diagram of a portion of a seat assembly for a vehicle, including a rigid member.
Figure 4:
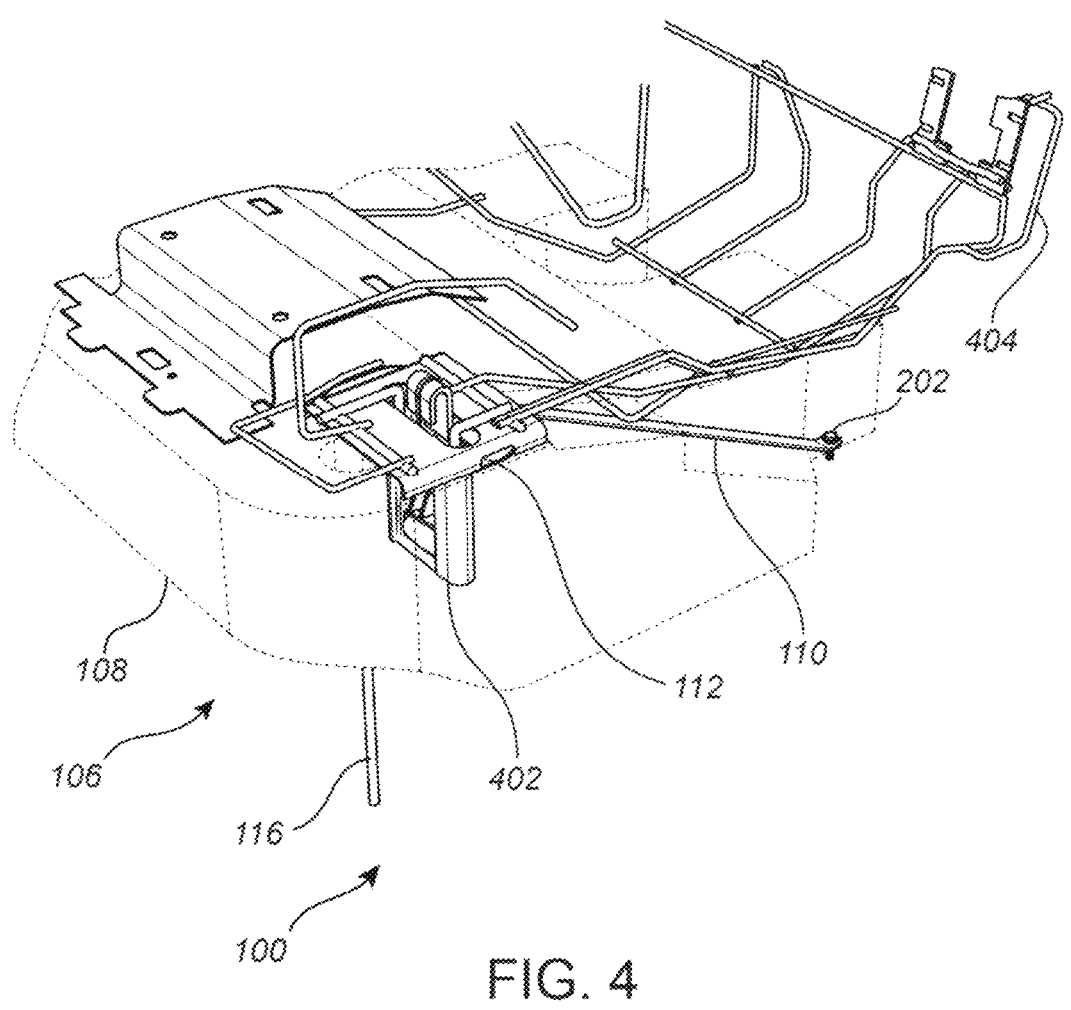
FIG. 4 is a perspective-view diagram of a portion of a seat assembly for a vehicle, including a frame of a seat bottom.

As described in more detail herein, in connection with FIG. 4, a tab passes through the slot 112 to connect the seat filler structure 108 to the seat bottom (FIG. 1). With the rigid members 110 held in place and attached to the floor structure, the arms or body of the rigid members 110 provide longitudinal/lateral support for the seat filler structure 108, where a greater angle provides a greater resistance against the seat filler structure 108. This thereby prevents the seat filler structure 108 and thus the entire seat from sliding longitudinally/laterally in the event of a sudden stop or collision. As described in more detail herein, in connection with FIGS. 3 and 4, the tab (FIG. 4) functions as an anchor point for the seat filler structure 108, preventing the seat filler structure 108 from sliding longitudinally/laterally in the event of a sudden stop or collision.

In various embodiments, the rigid member 118 attaches to the floor structure (not shown) using any suitable techniques, such as screws. Similar to the rigid members 110, the rigid member 118 passes through the seat filler structure 108 at a predetermined angle relative to the bottom plane of the seat filler structure 108 and the floor structure or floor (not shown) of the vehicle. In this example, the rigid member 118 passes through the seat filler structure 108 at approximately 45 degrees relative to the bottom plane of the seat filler structure 108.

Similar to the interrelation between the rigid members 110 and the seat filler structure 108, the predetermined angle of the rigid member 118 provides inherent longitudinal/lateral support for the seat filler structure 108. With the rigid member 118 held in place, attached to the floor structure, the arm or body of the rigid member 118 provides longitudinal/lateral support for the seat filler structure 108. In various embodiments, a greater angle provides a greater resistance against the seat filler structure sliding longitudinally/laterally in the event of a sudden stop or collision.

Furthermore, to provide additional longitudinal/lateral support for the seat filler structure 108, the rigid member 118 includes the hook member 114 at the upper end. The hook member 114 passes through a hole at the top of the seat filler structure 108. As shown, the end of the hook extends out of the hole and faces toward the back seat 102 and the rear of the vehicle. As such, the hook member 114 provides further support for the seat filler structure 108, preventing the seat filler structure 108 from sliding longitudinally/laterally in the event of a sudden stop or collision.

FIG. 3 is a perspective-view diagram of a portion of a seat assembly for a vehicle, including a rigid member. Shown is the seat filler assembly 106 positioned underneath the seat bottom 104 along with the seat back 102 and the seat bottom 104 of FIG. 1. The seat filler assembly 106 is shown in a transparent view showing the rigid member 110 disposed through the seat filler structure 108.

As described above, in various embodiments, the rigid member 110 passes through the seat filler structure 108 at a predetermined angle (e.g., at approximately 45 degrees) relative to the bottom plane of the seat filler structure 108 and the floor structure or floor (not shown) of the vehicle.

Also, the predetermined angle provides inherent longitudinal/lateral support for the seat filler structure 108. As shown, the rigid member 110 is attached to the floor structure with the screw 202.

In various embodiments, the rigid member 110 is nestled in or set into a cavity 302 positioned at the top of seat filler structure 108. As shown, an upper end portion or end 302 of the rigid member 110 is oval shaped. The particular shape of the end 302 may vary, depending on the embodiment. As shown, the end 302 of the rigid member 110 protrudes out from a channel of seat filler structure 108 and is set into the cavity 304. At least a portion of the cavity 304 is shaped such that it conforms to the contours of the end 302 of the rigid member 110 and is sufficiently deep so as to receive the end 302 of the rigid member 110. As shown, the end 302 of the rigid member 110 is set in the cavity 304 such that the end 304 of the rigid member 110 is flush with the top of the seat filler structure 108.

In various embodiments, the end 302 of the rigid member 110 widens to fill the cavity 304. This snug fit securely fixes the end 302 of the rigid member 110 into the cavity 304 in order to provide additional longitudinal/lateral support for the seat filler structure 108, thereby preventing the seat filler structure 108 from sliding longitudinally/laterally in the event of a sudden stop or collision.

In various embodiments, the increased width of the end 302 of the rigid member 110 also provides room for the slot 112. The width of the end 302 may vary, depending on the length of the slot 112 required to receive a corresponding tab. As described in more detail below, a tab (FIG. 4) passes through the slot 112 and couples the seat filler structure 108 to the seat bottom 104. An example interrelation among the seat filler structure 108, the tab, and the seat bottom 104 is described in more detail herein, in connection with FIG. 4.

FIG. 4 is a perspective-view diagram of a portion of a seat assembly for a vehicle, including a frame of a seat bottom. As indicated above the seat assembly includes the seat with its seat back 102 and its seat bottom 104, and includes the seat filler assembly 106. As indicated above, the seat filler assembly 106 includes the seat filler structure 108 and associated seat filler assembly components.

The seat filler assembly components include the rigid member 110 having a slot 112, the fixation member 116, and the screw 202. Also shown are a tab 402 and a seat bottom frame 404 for the seat bottom (FIGS. 1, 2, and 3). The seat filler assembly 106 is shown in a transparent view showing the rigid member 110 disposed through the seat filler structure 108, and showing the portion of the tab 402 that is disposed inside of the seat filler structure 108. In other embodiments, the seat filler assembly 106 may not have all of the components shown and/or may have other elements including other types of elements instead of, or in addition to, those shown herein.

As described above, the tab 402 passes through the slot 112 of rigid member 110. The tab 402 functions to couple the seat filler structure 108, the rigid member 110, and the seat bottom frame 404 for a seat bottom. The techniques for coupling may vary depending on the particular implementation. For example, in various embodiments, the tab 402 is shaped such that it securely snaps into the frame 404 of the seat bottom.

The rigid member 110 is secured to the floor structure (now shown) via the screw 202 and the fixation member 116. In various embodiment, one or more other rigid members (not shown) are similarly secured to the floor structure. With the rigid member 110 held in place, the rigid member 110 provides longitudinal/lateral support for the seat filler structure 108, as described herein, preventing the seat filler structure 108 from sliding longitudinally/laterally in the event of a sudden stop or collision.

Figure 5:
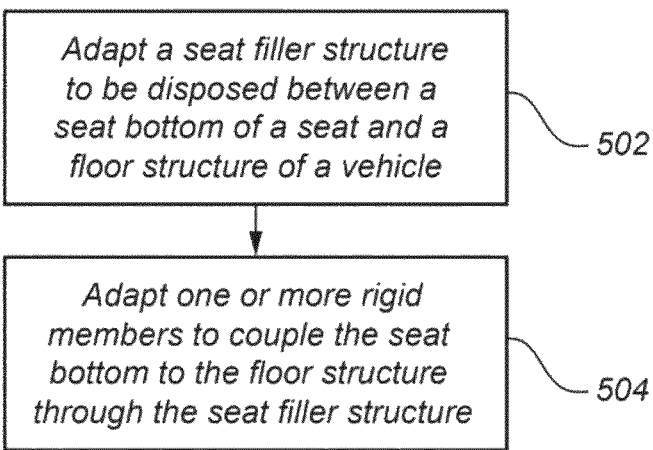
FIG. 5 is a flow chart for manufacturing a seat filler assembly for a vehicle.

FIG. 5 is a flow chart for manufacturing a seat filler assembly for a vehicle.

Referring to both FIGS. 1 through 4, a method is initiated at block 502, where a filler structure is adapted to be disposed between a seat bottom of a seat and a floor structure. The seat filler structure 108 elevates the seat at a predetermined height above the floor structure of the vehicle.

At block 504, one or more rigid members are adapted to couple the seat bottom to the floor structure through the seat filler structure. As described herein, in various embodiments, the seat filler structure 108 provides support for the seat, the seat bottom 104 in particular, where the rigid members 110 provide longitudinal/lateral restraint for the seat.

The seat filler structure 108 includes passages through which the rigid members are received. In various embodiments, one or more of the rigid members include a slot at one end, where the slot is adapted to receive a tab for securing the seat bottom to the seat filler structure.

In various embodiments, at least one rigid member includes the hook member 114. The hook member 114 is adapted to hook onto the seat bottom 104 for securing the seat bottom 104 to the seat filler structure 108. As described above, the seat assembly 106 also includes one or more fixation members 116. The fixation members 116 position at least one rigid member 110 for attachment to the seat bottom 108.

Although the steps, operations, or computations may be presented in a specific order, the order may be changed in particular implementations. Other orderings of the steps are possible, depending on the particular implementation. In some particular implementations, multiple steps shown as sequential in this specification may be performed at the same time. Also, some implementations may not have all of the steps shown and/or may have other steps instead of, or in addition to, those shown herein.

Figure 6:
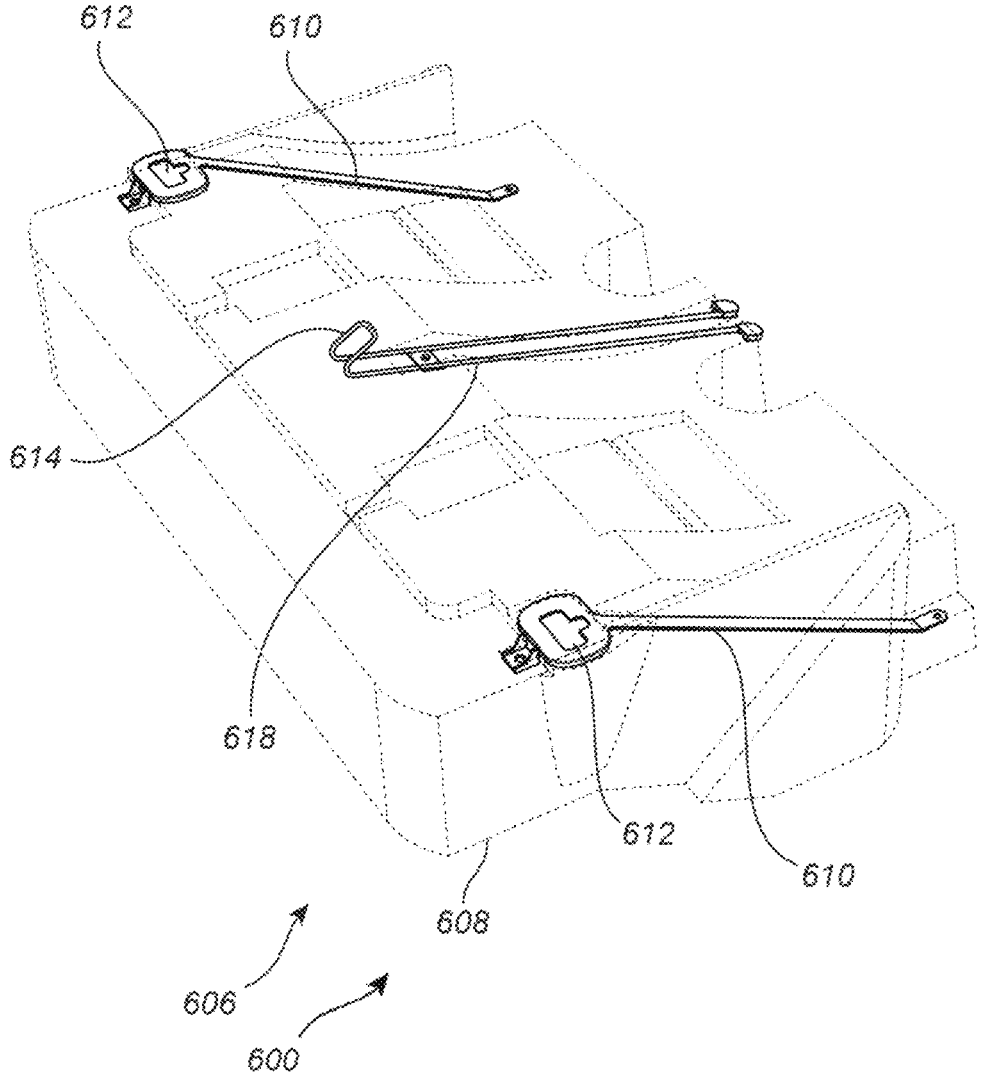
FIG. 6 is a perspective-view diagram of a portion of a seat assembly for a vehicle, including seat filler structure components.

FIG. 6 is a perspective-view diagram of a portion of the seat assembly 600 for a vehicle, including seat filler structure components. Shown is a seat filler assembly 606 (indicated by an arrow) in a transparent view showing various components of the seat filler assembly 606. In various embodiments, the seat filler assembly 606 includes a seat filler structure 608, rigid members 610, slots 612 of the rigid members 610, and a hook member 614 attached to a center rigid member 618. In other embodiments, the seat filler assembly 606 may not have all of the components shown and/or may have other elements including other types of elements instead of, or in addition to, those shown herein.

As shown, in various embodiments, the rigid members 610 and 618 pass through the seat filler structure 608 at a predetermined angles relative to the bottom plane of the seat filler structure 608 and the floor structure or floor (i.e., BIW) of the vehicle (not shown). In various embodiments, the rigid members 610 and 618 attach to the floor structure using any suitable techniques, such as screws.

In the embodiment shown, the center rigid member 618 extends from the top surface of the seat filler structure 608 to the rear end of the seat filler structure 608. The hook member 614 at the top end of the center rigid member 618 extends out from the top surface of the seat filler structure 608 and attaches to a seat bottom (FIG. 1). The top end of the rigid members 612 also attach to the seat bottom. While slots 612 are shown in this example embodiment, the attachment or fixation between the rigid members 612 and the seat bottom may but need not be by way of slots 612. The particular technique of fixation may vary, depending on the implementation. For example, the fixation may be a screw fixation, a snap fixation, etc.

With the rigid members 610 and 618 held in place and attached to the floor structure, the arms or body of the rigid members 610 and 618 provide longitudinal/lateral support for the seat filler structure 108, where a greater angle provides a greater resistance against the seat filler structure 608. This thereby prevents the seat filler structure 608 and thus the entire seat from sliding longitudinally/laterally in the event of a sudden stop or collision.

Embodiments described herein have numerous benefits. For example, embodiments provide a seat filler structure that in turn provides support for a seat. Rigid members of a seat filler structure provide longitudinal/lateral restraint for the seat. The longitudinal/lateral restraint prevents the seat filler structure from sliding longitudinally/laterally in the event of a sudden stop or collision. The components of the seat filler assembly and the manufacturing process are simplified. There are no in-molded steel parts in the seat filler assembly. As such, the recycling of the seat filler structure and its components is simplified as the components may be easily separated for recycling. The seat filler assembly is also lighter in weight compared to conventional seat fillers.

Although the present disclosure is illustrated and described herein with reference to illustrative embodiments and specific examples provided, it will be readily apparent to those of ordinary skill in the art that other embodiments and examples may perform similar functions and/or achieve like results. All such equivalent embodiment and examples are within the spirit and scope of the present disclosure and are intended to be covered by the following non-limiting claims for all purposes.

What is claimed is:

1. A seat filler assembly for a vehicle, the seat filler assembly comprising:

a seat filler structure comprising a single molded piece adapted to be disposed between a seat bottom of a seat and a floor structure of the vehicle; and one or more rigid members adapted to couple the seat bottom to the floor structure through and span a height of the seat filler structure, wherein one end of each of the one or more rigid members is attached to the seat bottom at a top of the seat filler structure and another end of each of the one or more rigid members is attached to the floor structure at a bottom of the seat filler structure.

2. The seat filler assembly of claim 1, wherein the seat filler structure provides elevational support for the seat, and wherein the one or more rigid members provide longitudinal/lateral restraint for the seat through the seat filler structure.

3. The seat filler assembly of claim 1, wherein the seat filler structure elevates the seat at a predetermined height above the floor structure of the vehicle.

4. The seat filler assembly of claim 1, wherein the seat filler structure comprises one or more passages through which the one or more rigid members are received.

5. The seat filler assembly of claim 1, wherein at least one rigid member of the one or more rigid members comprises a slot, and wherein the slot is adapted to receive a tab for aligning the seat bottom with the seat filler structure.

6. The seat filler assembly of claim 1, wherein at least one rigid member of the one or more rigid members comprises a hook member, and wherein the hook member is adapted to hook onto the seat bottom for securing the seat bottom to the seat filler structure.

7. The seat filler assembly of claim 1, further comprising one or more fixation members, wherein at least one fixation member of the one or more fixation members positions at least one rigid member of the one or more rigid members for attachment to the seat bottom.

8. A seat assembly for a vehicle, the seat assembly comprising:

a seat; and a seat filler structure comprising a single molded piece adapted to be disposed between a seat bottom of the seat and a floor structure of the vehicle; and one or more rigid members adapted to couple the seat bottom to the floor structure through and span a height of the seat filler structure, wherein one end of each of the one or more rigid members is attached to the seat bottom at a top of the seat filler structure and another end of each of the one or more rigid members is attached to the floor structure at a bottom of the seat filler structure.

9. The seat assembly of claim 8, wherein the seat filler structure provides elevational support for the seat, and wherein the one or more rigid members provide longitudinal/lateral restraint for the seat through the seat filler structure.

10. The seat assembly of claim 8, wherein the seat filler structure elevates the seat at a predetermined height above the floor structure of the vehicle.

11. The seat assembly of claim 8, wherein the seat filler structure comprises one or more passages through which the one or more rigid members are received.

12. The seat assembly of claim 8, wherein at least one rigid member of the one or more rigid members comprises a slot, and wherein the slot is adapted to receive a tab for aligning the seat bottom with the seat filler structure.

13. The seat assembly of claim 8, wherein at least one rigid member of the one or more rigid members comprises a hook member, and wherein the hook member is adapted to hook onto the seat bottom for securing the seat bottom to the seat filler structure.

14. The seat assembly of claim 8, further comprising one or more fixation members, wherein at least one fixation member of the one or more fixation members positions at least one rigid member of the one or more rigid members for attachment to the seat bottom.

15. A method for providing a seat filler assembly for a vehicle, the method comprising:

disposing a seat filler structure comprising a single molded piece between a seat bottom of a seat and a floor structure of the vehicle; and coupling the seat bottom to the floor structure through and spanning a height of the seat filler structure using one or more rigid members, wherein one end of each of the one or more rigid members is attached to the seat bottom at a top of the seat filler structure and another end of each of the one or more rigid members is attached to the floor structure at a bottom of the seat filler structure.

16. The method of claim 15, wherein the seat filler structure provides elevational support for the seat, and wherein the one or more rigid members provide longitudinal/lateral restraint for the seat through the seat filler structure.

17. The method of claim 15, wherein the seat filler structure elevates the seat at a predetermined height above the floor structure of the vehicle.

18. The method of claim 15, wherein the seat filler structure comprises one or more passages through which the one or more rigid members are received.

19. The method of claim 15, wherein at least one rigid member of the one or more rigid members comprises a slot, and wherein the slot is adapted to receive a tab for aligning the seat bottom with the seat filler structure.

20. The method of claim 15, wherein at least one rigid member of the one or more rigid members comprises a hook member, and wherein the hook member is adapted to hook onto the seat bottom for securing the seat bottom to the seat filler structure.

* * * * *